US012716562B2

(12) United States Patent
Seiger

(10) Patent No.: US 12,716,562 B2
(45) Date of Patent: Aug. 25, 2026

(54) EXPANSION COMPENSATION DEVICE FOR A HEADLAMP

(71) Applicant: Hella GmbH & Co. KGaA, Lippstadt (DE)

(72) Inventor: Ralf Seiger, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 19/175,123

(22) Filed: Apr. 10, 2025

(65) Prior Publication Data

US 2025/0320976 A1 Oct. 16, 2025

(30) Foreign Application Priority Data

Apr. 15, 2024 (DE) ......................... 102024110425.2

(51) Int. Cl.
*F21S 41/19* (2018.01)

(52) U.S. Cl.
CPC .................................. *F21S 41/192* (2018.01)

(58) Field of Classification Search
CPC .......... F21S 45/00; F21S 41/192; F21S 41/39; F21S 41/19; F21S 41/00; F21S 41/29; F21S 41/295; F21W 2102/00; F21W 2107/10; B60Q 1/0683; B60Q 1/045; G02B 7/008; G02B 7/028
See application file for complete search history.

(56) References Cited

U.S. PATENT DOCUMENTS

2010/0277935 A1* 11/2010 Endo ...................... B60Q 1/302
348/148

FOREIGN PATENT DOCUMENTS

| | | | | |
|---|---|---|---|---|
| DE | 2510290 | A1 | 9/1975 | |
| DE | 2513716 | A1 | 10/1975 | |
| DE | 102018101983 | A1 | 8/2019 | |
| EP | 2133722 | A1 * | 12/2009 | ............. G02B 7/008 |
| EP | 3960542 | A1 | 3/2022 | |
| WO | WO-2023134818 | A1 * | 7/2023 | ............. G02B 7/008 |

OTHER PUBLICATIONS

English translation of EP-2133722-A1 (Year: 2009).*
English translation of WO-2023134818-A1 (Year: 2023).*

* cited by examiner

*Primary Examiner* — Omar Rojas Cadima
(74) *Attorney, Agent, or Firm* — Husch Blackwell LLP

(57) ABSTRACT

A device is provided for compensating for thermal expansion in a headlamp, such as for a vehicle. A compensator is configured to expand or contract in an expansion direction (A), depending on the temperature. A tappet is functionally connected to the compensator that moves in a compensation direction (K) when the compensator expands or contracts along the expansion direction (A). A lever rotationally and/or pivotally connects the compensator to the tappet to obtain the functional connection.

18 Claims, 7 Drawing Sheets

EXPANSION COMPENSATION DEVICE FOR A HEADLAMP

CROSS REFERENCE

This application claims priority to German Application No. 10 2024 110425.2, filed Apr. 15, 2024, the entirety of which is hereby incorporated by reference.

FIELD OF THE INVENTION

The invention relates to a device that compensates for thermal expansion in a headlamp.

BACKGROUND OF THE INVENTION

There are headlamps for vehicles that can contain a light unit, e.g. a high beam light and/or low beam light. These can be used to light the area in front of (or behind) the vehicle. They can generate a light/dark boundary, in particular in the case of a headlamp generating a low beam light distribution, which extends substantially horizontally. The area containing oncoming traffic can be a least partially shaded in this case. With changes in temperature, in particular increases (e.g. generated by electrical losses in the headlamp, vehicle heat, motor heat, and/or ambient temperatures) and/or decreases (e.g. caused by ambient temperature, cooling and/or shutting off the vehicle/motor), the headlamp and/or its components may expand and/or contract. This results in (mechanical) movement that may alter the lighting characteristics. In particular, the light/dark boundary may shift (in an undesirable manner). This could result in insufficient lighting by the vehicle and/or for the driver. This could also blind oncoming traffic, impacting the safety of other road users. It is therefore beneficial to at least partially reduce thermal expansion and/or contraction caused by temperature changes.

Existing methods and systems from the prior art have a variety of disadvantages. These may be due to an insufficient adjustment range. These systems, or the adjustability thereof, may be complex and/or expensive. Moreover, compensation for, and/or stabilization of, thermal expansion may be insufficient. These existing systems may also not be sufficiently adaptive, because they require a specific design for different headlamps, or the requirements thereof. By way of example, the installation space may vary substantially. This can also increase production costs.

BRIEF SUMMARY OF THE INVENTION

One object of the present invention is to therefore at least partially overcome at least one of the disadvantages described above. In particular, the object of the invention is to create a better device with which thermal expansion and/or contraction can be compensated for. Another object is to obtain a device that can be adjusted more easily and/or accurately. Another object is to create a device with an optimal and/or consistent installation size, and a device that can be adapted more easily to various installation spaces, and/or different directions.

Features and details described in the context of the device obtained with the invention also apply to the headlamp (and a vehicle) obtained with the invention and vice versa, such that reference can be and is made in both cases to the individual aspects of the invention in this disclosure. In particular, those advantages obtained with the first or second aspect of the invention also apply to the other aspect.

The first object of the invention described above is achieved by a device with which thermal expansion and/or contraction in a headlamp (or of its components), in particular for a vehicle, are compensated for, which contains: a compensator designed to expand or contract along an expansion direction, depending on the temperature; a tappet functionally connected to the compensator that moves along a compensation direction when the compensator expands or contracts along the expansion direction; a lever that rotationally and/or pivotally connects the compensator to the tappet to obtain the functional connection.

A thermal change and/or temperature change, e.g. caused when the headlamp, in particular the light unit therein, is operated, can be result in (geometric) expansion and/or contraction of the headlamp and/or its components. This can compensate for thermal deformation (in particular expansion and/or contraction), preferably of the compensator (and at least some of the other components), such that there is very little or no change in the lighting properties of a light unit and/or the headlamp connected to the device (or placed thereon). In other words, expansion and/or contraction of the compensator at least partially (preferably fully) compensates for any thermal deformation of the other components. This stabilizes and/or maintains a light/dark boundary (at the same position in relation to the headlamp). In this manner, any expansion and/or contraction of the headlamp, light unit, compensator, lever, tappet, housing, and/or retainer can be (ideally entirely) compensated for. This can be based on the (material-specific) thermal coefficient of the compensator in particular. The shape of and/or materials forming the compensator, lever, tappet, housing, and/or retainer can be used to determine the thermal deformation, in particular in advance, e.g. during development (through simulation), such that an optimal compensation for any deformation can be obtained for a specific temperature range (e.g. −20° to 60° C.) when it is later put to use.

The compensator is designed to expand and/or contract, based on the temperature and/or changes thereof. The compensator can expand and/or contract along an expansion direction, in particular in the longitudinal direction of the compensator (see drawings). In the event of expansion and/or contraction, the length of the compensator changes, and/or at least parts of it can move. The compensator can be connected to the housing (see below), in particular at a fixed point (such that it can rotate and/or pivot thereon). When the compensator changes shape, the end not attached to the housing can move in relation to the housing. This movement can be transferred to the lever and/or tappet. This may change the direction of the movement. The compensator can contain polybutylene terephthalate (PBT) and/or polyoxymethylene (POM).

The tappet is preferably mechanically connected to the compensator. The tappet can move, in particular in the compensation direction, specifically in relation to the housing for the device. It can be assumed that the compensator only, and/or primarily, expands and/or contracts if there is a change in temperature. The mechanism of the invention is most easily understood with regard to the compensator. If the shape of the compensator is altered thermally, the resulting movement can be transferred to the tappet, in particular by the lever, or the connection thereto. This moves the tappet, in particular in relation to the housing, retainer, compensator and/or lever. The tappet can be connected to a light unit. This light unit can be moved by the movement of the tappet. This results in a compensation for and/or stabilization of movement of the light unit as a result of the (thermal) deformation of the compensator. The tappet and/or joint can contain polybutylene terephthalate (PBT) and/or sintered steel D10.

The lever can be connected to the compensator and/or the tappet, preferably such that it can rotate and/or pivot. The lever can be designed to convert expansion and/or contraction of the compensator, and/or the associated movement (along the expansion direction), to movement in another direction, and/or the compensation direction, in particular through the functional connection thereto. This results in greater and/or more precise adjustability. In particular, larger/smaller deformations/movements of the compensator can be converted to smaller/larger movements of the tappet (in an adjustable manner). This results in greater freedom in terms of design, construction, assembly, and/or maintenance of the device and/or a headlamp. By way of example, an upper end of the lever can be rotatably and/or pivotally connected to the compensator, in particular by a compensator-lever pin, about which the lever and/or compensator can preferably rotate and/or pivot. By way of example, a lower end of the lever can be rotatably and/or pivotally connected to the tappet, in particular by a lever-tappet pin, about which the lever and/or tappet can preferably rotate and/or pivot. The compensator-lever pin and/or lever-tappet pin can be vertical, such that they are perpendicular to the expansion direction and/or compensation direction. The first and/or second lever can contain steel, for example.

It may be advantageous to form a hole in the lever through which a insertion pin can be inserted (freely and/or variably and/or releasably and/or manually), wherein the lever can then rotate and/or pivot about this insertion pin. The insertion pin can contain steel, for example.

The insertion pin can be such that it does not rotate in relation to the housing and/or lever. The insertion pin preferably comprises a (cylindrical) threaded bolt, which can be screwed into a threaded hole in the housing, and subsequently be removed therefrom. The insertion pin could also be able to rotate in relation to the housing and/or lever. The housing (in particular part or half of the housing) preferably encircles at least part of the insertion pin in a form-fitting manner. This keeps the insertion pin in place. The insertion pin can also be secured in the hole and/or a second hole in the lever, e.g. when the insertion pin is a threaded cylinder that can preferably be screwed into a threaded hole. At least part of the insertion pin can form a shaft, in particular such that it cannot rotate in relation to the housing. The insertion pin can contain steel and/or polyethylene. The insertion pin can preferably rotate in relation to at least the housing or lever.

The device obtained with the invention can have a retainer with which it can be installed in an adjustable manner in or on the headlamp, in that the retainer is aligned with the tappet, wherein the retainer and tappet are spaced apart, and the distance between them changes with the temperature.

The retainer can have a setscrew that can preferably be screwed into the housing. The end of the retainer extending out of the housing can be connected to the headlamp. This allows the retainer to be attached to a headlamp (housing). The retainer can be designed to adjust the distance between the headlamp and the device and/or housing. This can be a rough adjustment. This allows the device and/or housing to be positioned inside the headlamp. By way of example, the retainer, in particular the setscrew, can be screwed into or out of a threaded hole in the housing. This allows for the spacing to be adjusted when the other end is attached to the headlamp. The retainer and tappet are preferably not connected to one another. Consequently, adjustments can be made with the retainer and tappet independently of one another. The tappet can be used for fine adjustments. In particular, the tappet can enable compensation for deformation of the compensator. The retainer preferably has an elongated and/or cylindrical (threaded) shape. The retainer and tappet can extend along the compensation direction. This results in particularly efficient adjustment and/or transfer of forces.

The expansion direction can be at an angle to the compensation direction in the framework of the invention.

The expansion direction is preferably not the same as the compensation direction. They can be at an angle to one another, in particular such that one is horizontal, and the other is vertical. This means that a thermal expansion of the compensator in the expansion direction can be converted (by the lever) to a movement of the tappet in the compensation direction. This enables a translation (like with a gearing). This allows for a particularly precise (fine) adjustment and/or compensation. The compensation direction preferably follows the direction in which light is emitted by the light unit. The compensation direction, vertical axis, and horizontal axis can form an (orthogonal) right-handed system. The light/dark boundary can also (substantially) follow the horizontal axis (such that the dark portion is on top, extending into the sky, and the light is at the bottom, extending over the street surface). This light/dark boundary may move due to thermal deformation of the headlamp and/or the light unit, e.g. upwards, thus blinding oncoming traffic. By compensating for this movement with the device, the light/dark boundary can be stabilized and/or kept in place (permanently).

The expansion direction and compensation direction could also be (substantially or nearly) parallel, at least in sections, in particular when the compensator is (nearly) parallel to the tappet, or the longitudinal extension of the compensator is substantially parallel to that of the tappet. The design of the lever can allow for a nearly parallel movement of the two. This allows for a reduction in the necessary installation space.

It is also conceivable for the lever to have at least one more hole, in particular second, third, or fourth holes, into which the insertion pin can be inserted in order to obtain a different rotational axis.

These holes in the lever can preferably be formed along the length thereof. One of the holes and/or the other holes are preferably horizontal. A second lever can also contain these holes. In particular, the first and second levers can be identical. These holes enable an adjustment of the insertion pin, the compensator, and/or the device. By way of example, the insertion pin can be placed at different positions and/or in different holes in the lever. The insertion pin can preferably be removed, and/or placed in any of the different holes, without tools. This allows for the pivot point and/or fulcrum of the lever to be altered, in particular in relation to the housing. Consequently, the thermal deformation of the compensator can be transferred to the tappet by the lever in a variety of ways. As a result, the movement of the tappet can be adjusted in relation to the compensator (in particular the geometry and/or material) and/or the insertion pin (in particular its position, or the hole into which it is inserted). This results in a better, more flexible adaptability of the structure, design, installation, and/or maintenance. Consequently, the same device can be used for a variety of headlamps, e.g. all of the vehicles produced by a single manufacturer. The compensator-lever pin can also be placed in any of the holes (see below). For this, the explanations above apply analogously.

It is also conceivable that at least part of the lever is curved.

This may make it easier to place the insertion pin and/or compensator-lever pin in any of the different holes. At least part of the lever may form an arc segment. This results in a particularly beneficial adjustability and/or mobility (rotational/pivotal). The radius of the curvature of the lever is preferably (substantially) identical to the length of the compensator. This reduces the friction and/or wear caused by the rotational and/or pivotal movement. This also enables and/or facilitates the placement thereof in different holes. At least part of the lever can also be straight. This simplifies production. The explanations above can also be applied analogously to the a second lever.

The tappet in the invention can also have a joint, in particular a ball joint, with which the device can be coupled to a light unit.

This joint can be on an end of the tappet that protrudes from the housing. The tappet can then be coupled to a light unit with the joint, e.g. by engaging in a socket on the light unit. This allows movement of the tappet to be transferred to the light unit. Deformations can be compensated for by this means. The light unit can contain a group of lights that generate light, in particular with a light/dark boundary, a reflector, a projector and/or (in the simplest case) an incandescent light or LED. The device and/or light unit can be incorporated and/or retained in a headlamp. The light unit can emit light in a specific and/or defined direction, which can be parallel and/or aligned with the compensation direction.

The device obtained with the invention can have a second lever, and the first and second levers can encompass the tappet and/or compensator.

The first and second levers can be identical, have the same shape, and/or be symmetrical (in particular in relation to a vertical plane in which the compensation direction lies). The upper ends of the first and/or second levers can be connected to the compensator (rotationally and/or pivotally), e.g. by a compensator-lever pin. The first and second lever can encompass the compensator (e.g. horizontally and/or on the right and left sides thereof). The lower ends of the first and/or second levers can be connected to the tappet (rotationally and/or pivotally), e.g. by a lever-tappet pin. In this case, the first and second levers encompass the tappet on both sides (e.g. horizontally and/or on the right and left sides thereof).

The lever could also be at the middle of the compensator and/or tappet, in particular such that the compensator and/or tappet encompass the lever on both sides. This results in greater stability and precision.

There could also be just one lever. This can be in the middle of the compensator and/or tappet. This reduces the weight and/or costs.

The insertion pin can be placed vertically in a variety of positions between the tappet and compensator, in the compensation direction, such that the compensator can be placed between the tappet and the insertion pin in the compensation direction.

This allows the functional direction to be adjusted. In other words, it is possible to reverse the functional direction. Consequently, the tappet can move in the other direction, depending on the configuration, in particular depending on the expansion and/or contraction of the compensator.

By way of example, the insertion pin can be placed in a variety of positions between the tappet and the compensator. In this manner, the insertion pin forms a central rotational and/or pivotal axis, about which the compensator and tappet preferably move in opposite directions. As a result, expansion of the compensator causes it to retract (into the housing). The compensator, in particular the compensator-lever pin, and the insertion pin are preferably placed in different holes. A greater spacing between them results in smaller movements of the tappet (and vice versa).

By way of example, the compensator can be placed between the tappet and the insertion pin in the compensation direction. The insertion pin can then be above the tappet and the compensator. In this manner, it forms an outer and/or upper rotational and/or pivotal axis, about which the compensator and tappet preferably move in the same direction. In this case, an expansion of the compensator results in an extension (from the housing). The compensator, in particular the compensator-lever pin, and the insertion pin are preferably placed in different holes. A greater spacing between them results in smaller movements of the tappet (and vice versa).

It may be advantageous for the compensator to have a compensator-lever pin, to which the first and second levers are rotationally and/or pivotally attached, with the compensator-lever pin being placed in one of the holes, and the insertion pin is then placed in another hole.

Consequently, the insertion pin and compensator-lever pin are not placed in the same holes. The compensator-lever pin can preferably extend from both sides of the compensator, e.g. forming a cylindrical axle. It can be rotationally connected to the first and/or second levers.

The tappet can have a lever-tappet pin. The lever-tappet pin can extend from both sides of the tappet, e.g. forming a cylindrical axle. It can be rotatably connected to the first and/or second levers. The tappet can preferably move in relation to the housing, e.g. on a (rail-like) guide (formed on the housing). The lever-tappet pin can preferably move in relation to the housing.

The compensator obtained with the invention can have a compensator-housing pin about which the compensator can rotate and/or pivot in relation to the housing for the device.

This compensator-housing pin can form a fixed point, pivot, and/or fulcrum for the compensator. The compensator can preferably rotate and/or pivot about the compensator-housing pin, in particular in relation to the housing, retainer, and/or tappet.

The device can have a bushing between the lever and tappet, which has at least one sliding surface, preferably two, along which the lever can move.

Consequently, the first and/or second levers can slide. Instead of sliding along the surface of the lever-tappet pin, this bushing provides sliding surfaces for the first and/or second levers. This can better compensate for surface pressure and reduce wear. The bushing can encompass part or all of the lever-tappet pin. The at least one (or both) sliding surface(s) can be vertical or horizontal. The two sliding surfaces can preferably be formed on opposite sides. The bushing can be placed on the lever-tappet pin.

The device can also have a housing that at least partially contains the compensator, first and second levers, insertion pin, retainer, and/or tappet (as well as some of the other components), and the insertion pin in particular can be placed in a hole in the housing, such that the lever can pivot thereon.

This hole can be aligned with one of the holes in the lever. There can also be as many as four other holes, each of which is preferably aligned with holes in the lever(s). The housing can have two parts or halves, forming a left and right half, respectively. These halves can be connected by a hinge, e.g. an integral hinge. This simplifies assembly, maintenance, and/or adjustments of the insertion pin and/or the compensator (or compensator-lever pin). The housing can also have a closure. This makes it possible to open and close the housing. The closure can comprise a lug and a hole into which the lug snaps. Ideally, this requires no tools. This allows for easier adjustments. The insertion pin can be secured in place mechanically, in particular such that it does not rotate, e.g. with a threading. It can also be retained in a form-fitting manner, in particular such that it cannot move horizontally.

The housing can also have a slider on which the housing can move on and/or in a headlamp.

The housing can be placed in the headlamp such that it can move linearly. It could also rotate and/or pivot within the headlamp. The housing can move in relation to the headlamp, in particular in the compensation direction, and/or parallel to the length of the slider. The slider could interact with a second slider on the headlamp, in that they engage with one another (releasably). The first and second sliders can be formed by rails and clips.

The object of the invention is also achieved by a headlamp that contains at least one, preferably two or three, of the devices described above.

At least one device can be secured in or on the headlamp, in particular within the headlamp assembly, preferably by the retainer. This enables compensation, vertically and/or horizontally, for expansion and contraction. By this means, compensation for a shift in the light/dark boundary can be obtained.

By coordinating the materials and/or shapes of the compensator, retainer, tappet, levers, headlamp, housing, and/or light unit, compensation for movement can be optimized during the development process (e.g. through mechanical and/or thermal simulations). The light unit can be substantially kept in the same position when subjected to different temperatures caused by heat emitted from the light unit or the motor, and thermal expansions within the headlamp can be compensated for. By this means, the light/dark boundary can kept in the same place, even when the headlamp is subjected to thermal fluctuations.

The headlamp obtained with the invention has the same advantages as the device obtained with the invention.

The object of the invention can also be achieved with a vehicle that contains at least one of the devices described above and/or the headlamps described above.

The vehicle has the same advantages as the device and/or headlamps obtained with the invention.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

The same reference symbols are used in all of the drawings for the same technical features, even in different exemplary embodiments.

Figure 1:
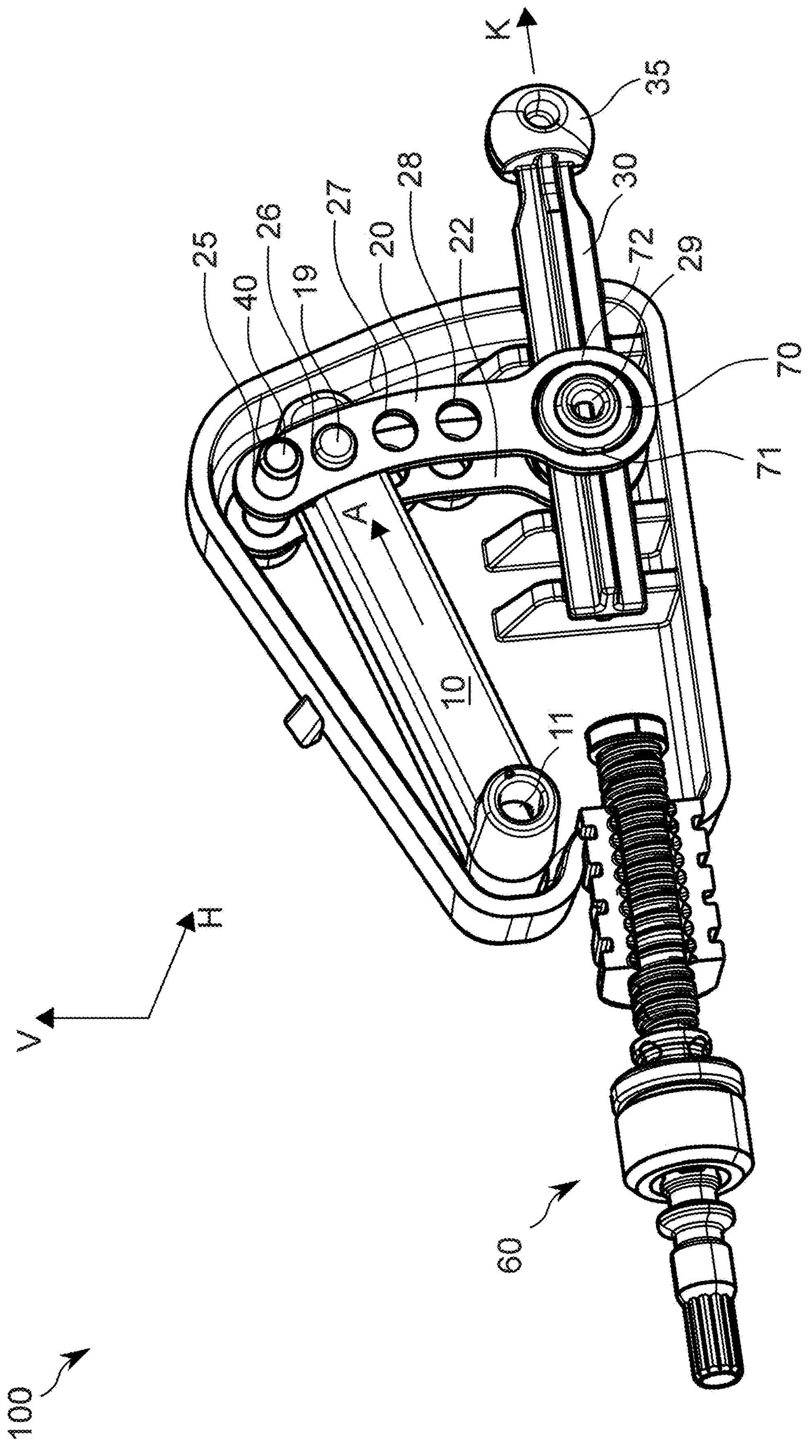
FIG. 1 shows an example device.

FIG. 1 shows a device 100 designed to compensate for thermal expansion in a headlamp 200, in particular for a vehicle 300, which contains: a compensator 10 configured to expand or contract along an expansion direction A, depending on the temperature; a tappet 30 functionally connected to the compensator 10, with which expansion or contraction of the compensator 10 along the expansion direction A results in movement of the tappet 30 along the compensation direction K; a lever 20 that rotatably and/or pivotally connects the compensator 10 to the tappet 30, to obtain the functional connection.

The lever 20 can have a hole 25 in which a pin 40 is inserted, about which the lever 20 can rotate and/or pivot.

The device 100 can also have a retainer 60 configured to retain the device on or in a headlamp 200 in an adjustable manner, which is aligned with the tappet 30 and spaced apart therefrom at a distance that changes with the temperature.

The expansion direction A can be at an angle to the compensation direction K.

The lever 20 can have at least one more hole 26, 27, 28, in particular a second, third or fourth hole 26, 27, 28, into which the pin 40 can be inserted, in order to obtain a different pivot axis.

At least part of the lever 20 can be curved. The first and/or second levers 20, 22 can pivot about a lever-tappet pin 29.

The tappet 30 may have a joint 35, in particular a ball joint 36, with which the device 100 can be coupled to a light unit.

The device 100 may have a second lever 22, and the first and second levers 20, 22 can encompass the tappet 30 and/or compensator 10 on both sides. The first and second levers 20, 22 are identical in the present example.

The compensator 10 can be placed between the tappet 30 and the insertion pin 40, in particular in relation to the compensation direction K, and/or vertically.

The compensator 10 may have a compensator-lever pin 19 about which the first and second lever 20, 22 can rotate and/or pivot, which is placed in one of the holes 25, 26, 27, 28, in which case the insertion pin 40 is placed in another hole 25, 26, 27, 28.

The compensator 10 can have a compensator-housing pin 11, about which the compensator 10 can rotate and/or pivot in relation to a housing 50 for the device 100.

The compensator 100 may have a bushing 70 between the lever 20 and the tappet 30, which has at least one sliding surface 71, preferably two sliding surface 71, 72, along which the lever 20 can move. This results in better guidance of the first and/or second levers 20, 22.

The vertical and horizontal axes V, H are indicated in FIG. 1. This is for purposes of clarity. The device could be oriented differently (fundamentally), to obtain advantages with the invention.

FIG. 1 shows a state in which the compensator 10 is not expanded, in a cooled, contracted state.

Figure 2:
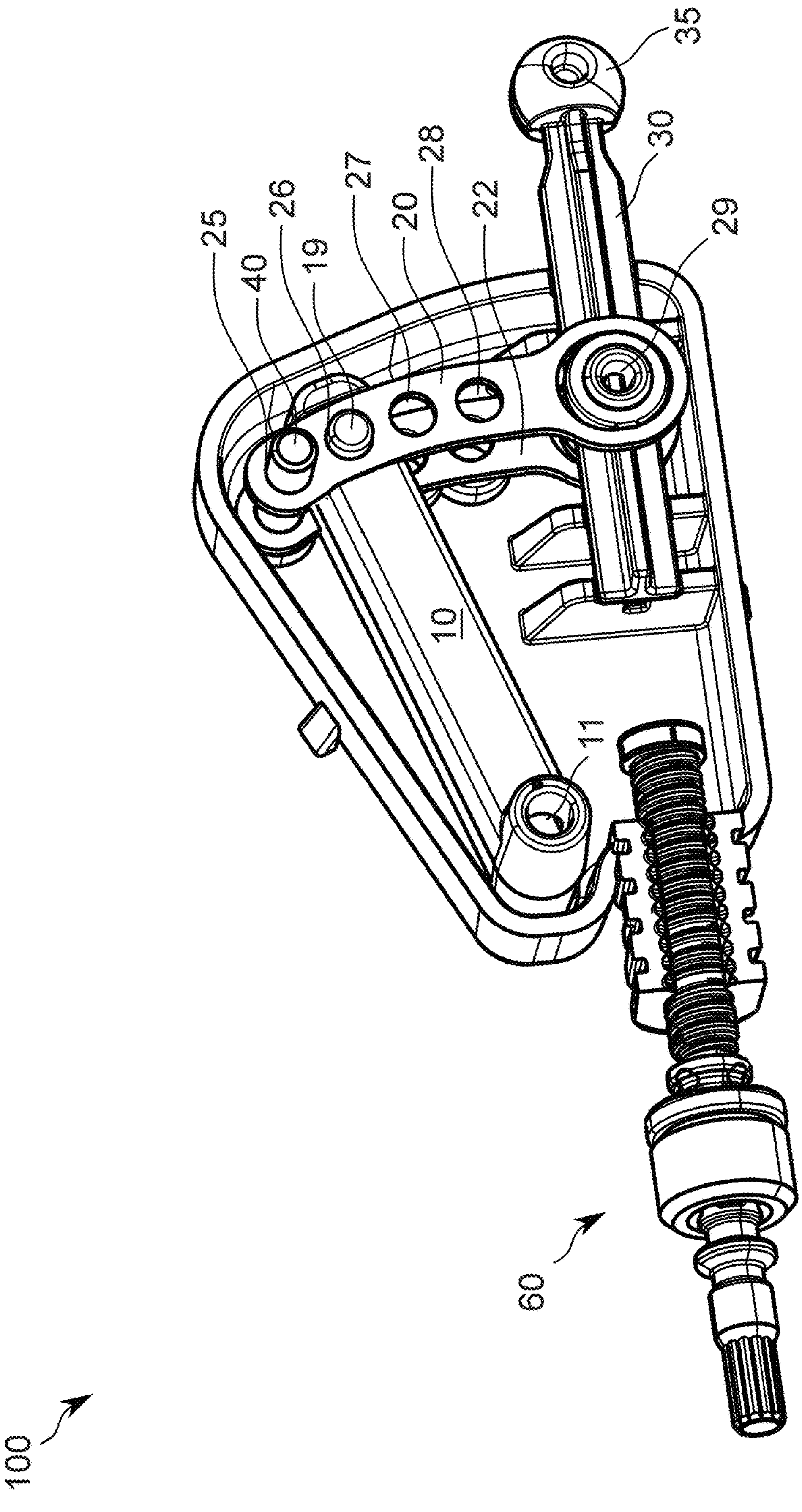
FIG. 2 shows an example device.

FIG. 2 shows, by way of example (and based on FIG. 1) a state of the device 100 in which the compensator 10 is expanded. This moves the first and/or second levers 20, 22, in particular resulting in a rotation and/or pivoting about the insertion pin 40. This moves the tappet 30, e.g. to the right (in FIG. 2). This transfers the thermal deformation (expansion) of the compensator 10 to the tappet 30.

Figure 3:
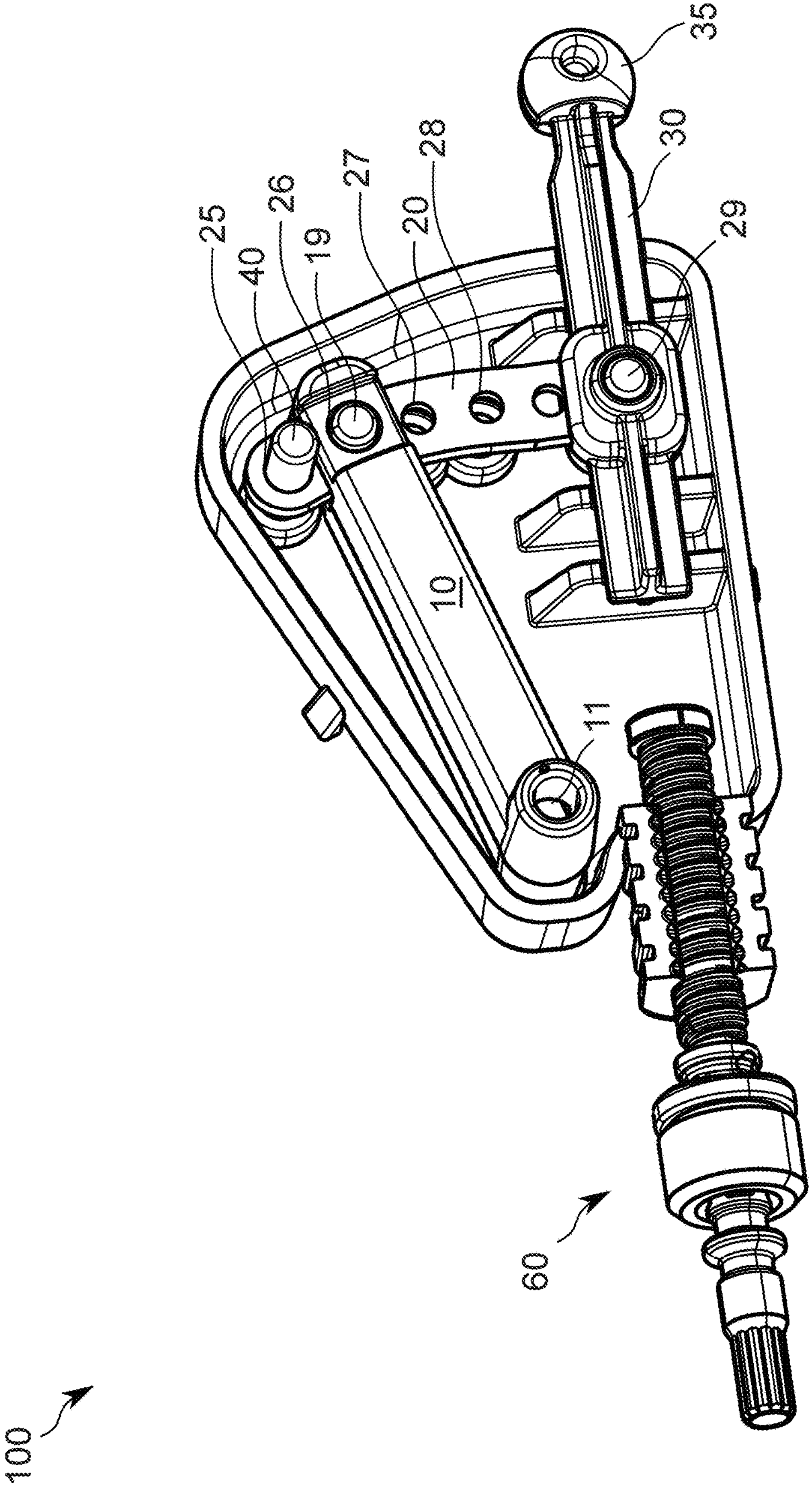
FIG. 3 shows an example device.

FIG. 3 shows (based on FIG. 1), a device 100 with just one lever 20. This lever 20 is placed in the middle of the compensator 10 and/or tappet 30, such that the compensator 10 and tappet 30 surround the lever 20 on both sides.

Figure 4:
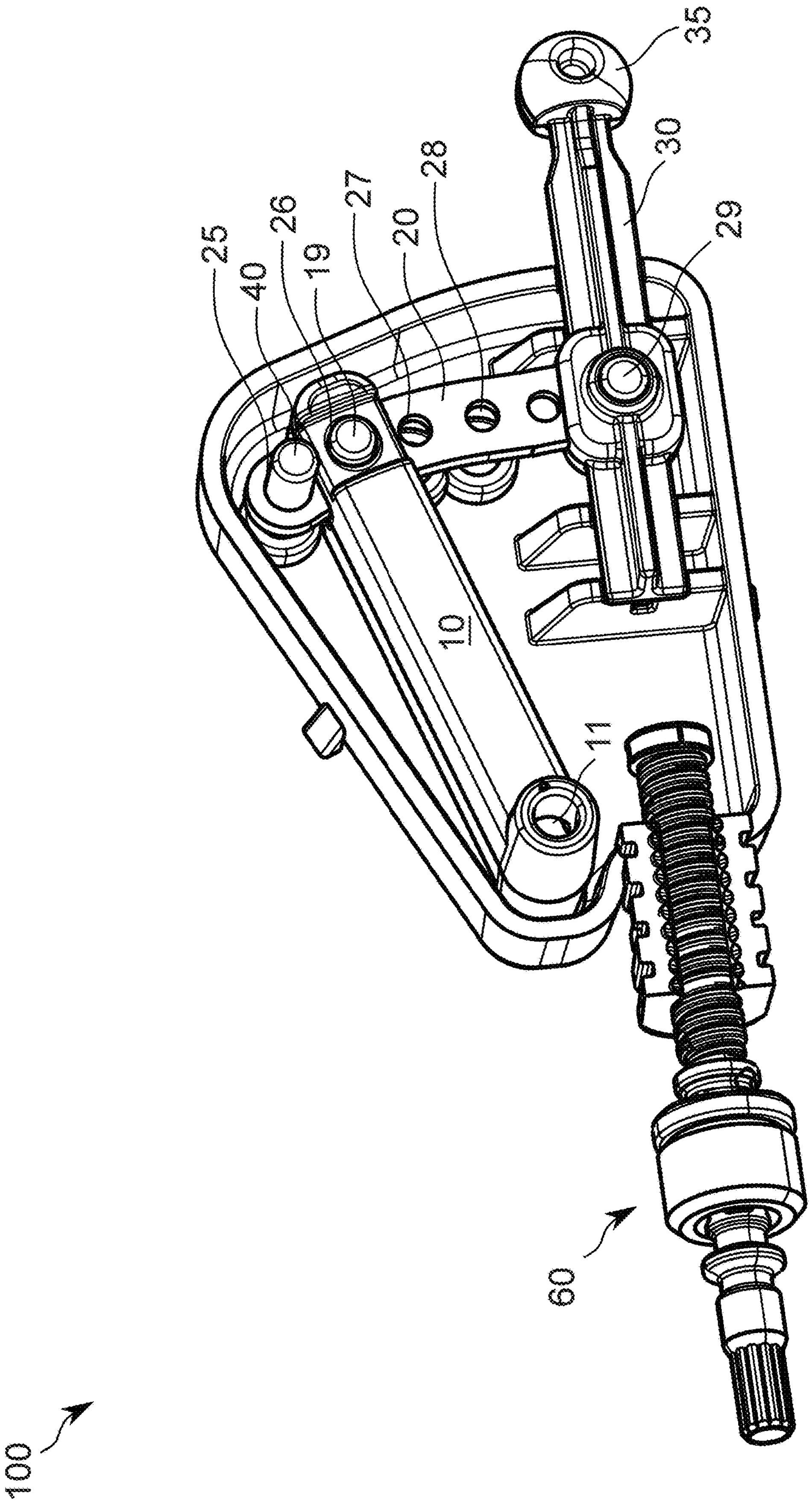
FIG. 4 shows an example device.

FIG. 4 shows (based on FIG. 3) a device with just one lever 20. When the compensator 10 expands (in comparison with FIG. 3), the lever 20 moves the tappet 30 (to the right in FIG. 4).

Figure 5:
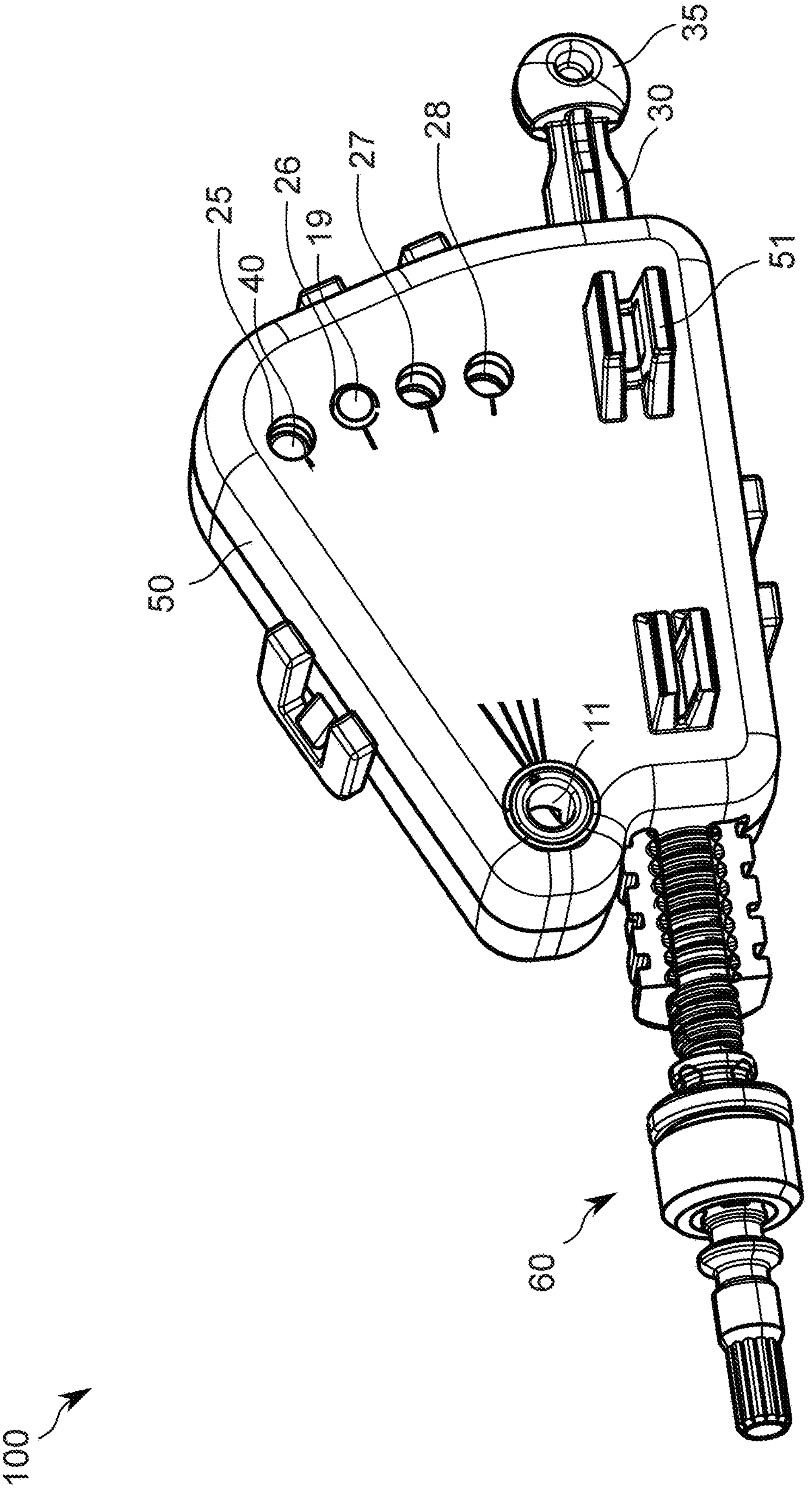
FIG. 5 shows an example device.

FIG. 5 shows (based on FIG. 1) a device 100 with a housing 50. The compensator 10 can have a compensator-housing pin 11 about which the compensator 10 can rotate and/or pivot in relation to the housing 50 for the device 100. The device 100 can also have a housing 50 that at least partially contains the compensator 10, first and second levers 20, 22, insertion pin 40, retainer 60, and/or tappet 30, and the insertion pin 40 can be inserted in a hole in the housing 50 such that the lever 20 can pivot about it, wherein the housing 50 has one or more sliders 51 on which the housing 50 can move on and/or in a headlamp 200.

Figure 6:
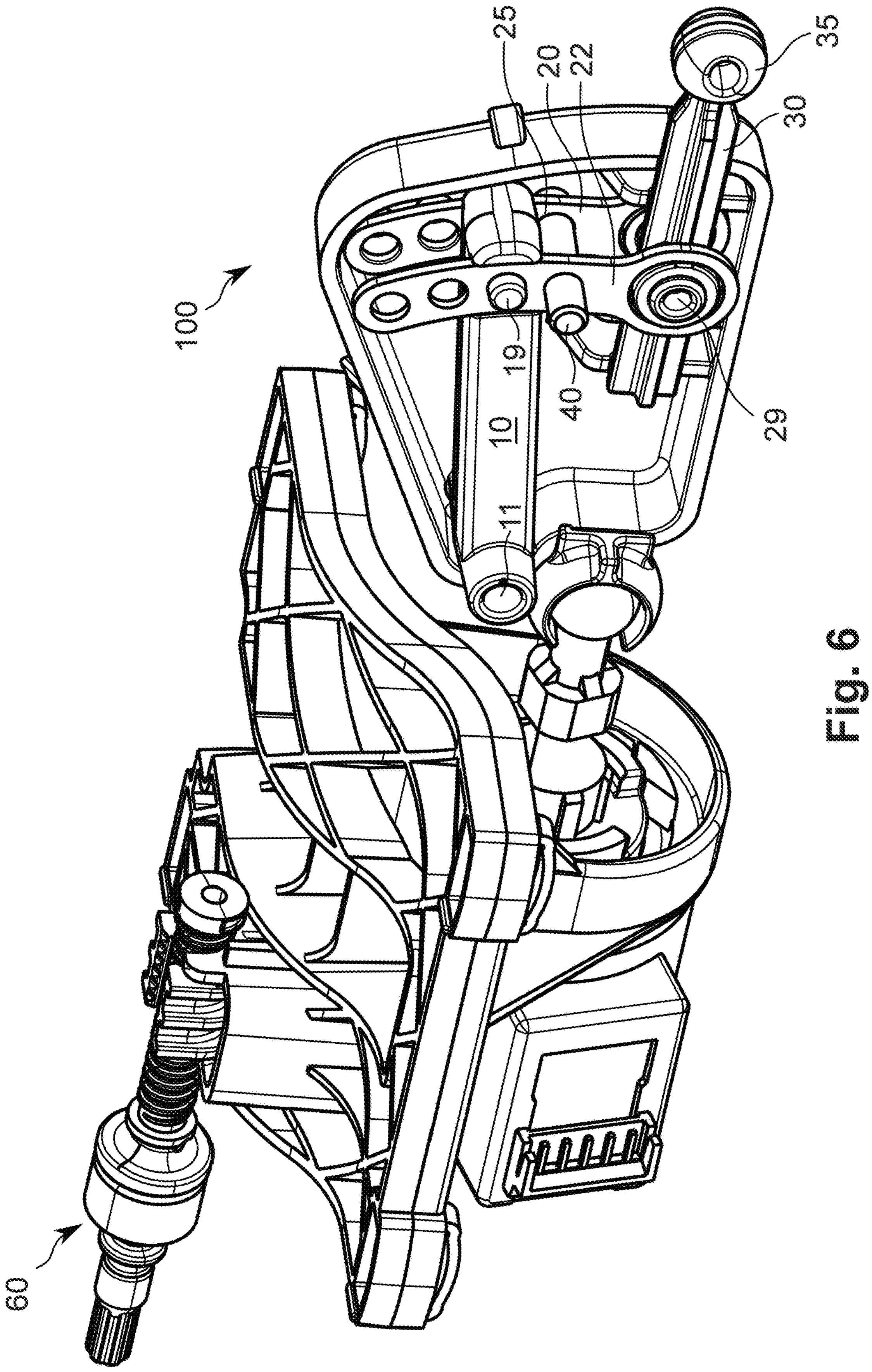
FIG. 6 shows an example device.

FIG. 6 shows a device 100 in which the insertion pin 40 is between the compensator 10 and the tappet 30. This allows the tappet 30 to move in the other direction (opposite that shown in FIGS. 1 to 5), due to a thermal deformation of the compensator 10. The tappet 30 can therefore move to the left and/or right in the housing 50 (in FIG. 6) if the compensator 10 expands. The device 100 can also be connected to a range adjuster (e.g. between the retainer 60 and the device 100). The retainer 60 can be placed on the range adjuster.

Figure 7:
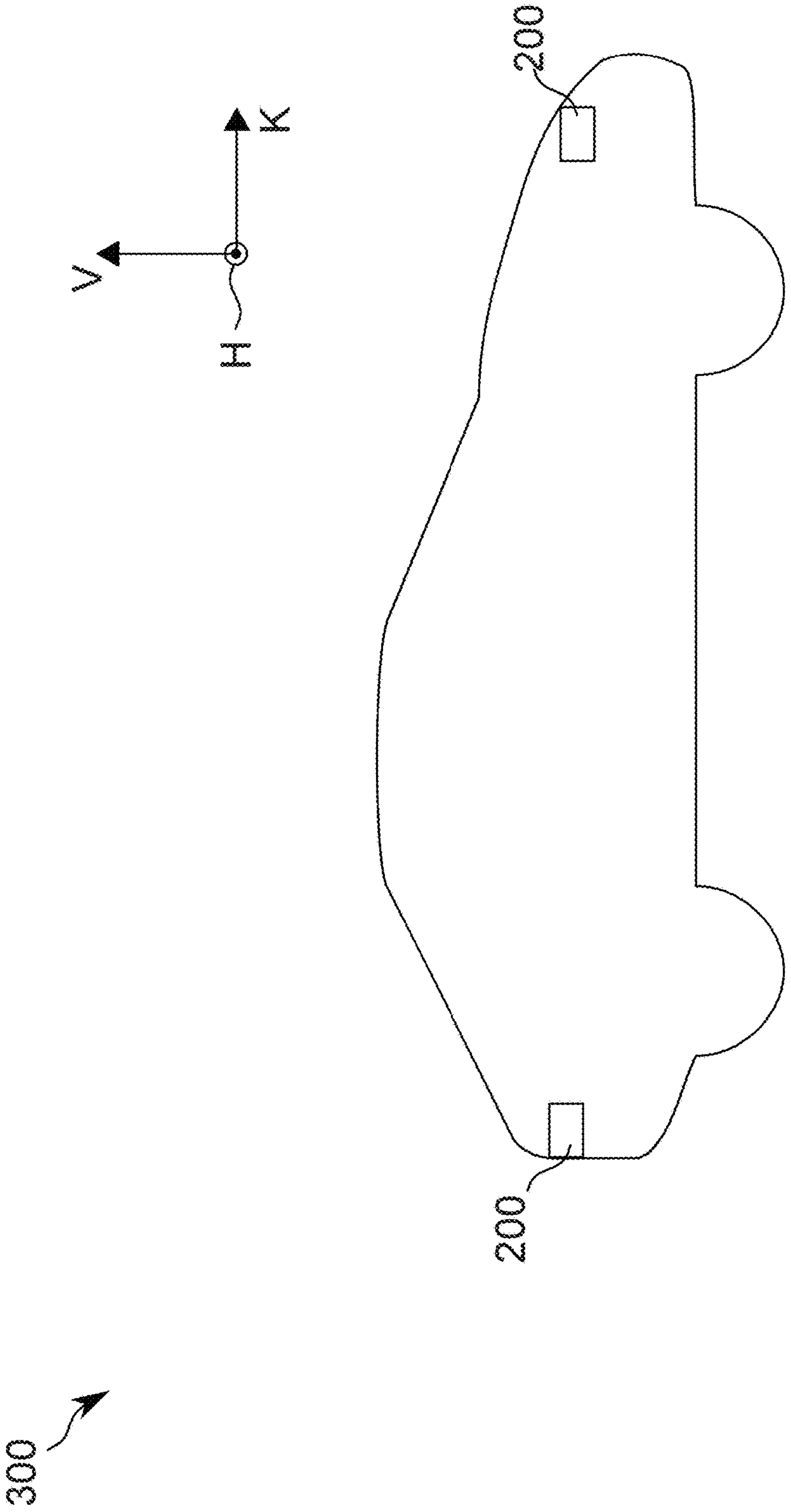
FIG. 7 shows a vehicle with headlamps.

FIG. 7 shows a vehicle 300 that has headlamps 200. These can contain one or more devices 100. This enables compensation for horizontal H and vertical V thermal deformation in the compensation direction K in and/or on the headlamp 200 by the device 100, in particular by the compensator 10. This can be enabled through the placement of the device(s) 100 in the (respective) headlamps 200.

LIST OF REFERENCE SYMBOLS 10 compensator
11 compensator-housing pin
19 compensator-lever pin
20 lever
22 second lever
25 hole
26, 27, 29 second, third and fourth holes
29 lever-tappet pin
30 tappet
35 joint
40 insertion pin
50 housing
51 slider
60 retainer
70 bushing
71, 72 sliding surfaces
100 device
200 headlamp
300 vehicle
A expansion direction
K compensation direction
V vertical axis
H horizontal axis

The invention claimed is:

1. A device for compensating for thermal expansion in a headlamp, the device comprising:
- a compensator configured to expand or contract in an expansion direction (A), depending on the temperature;
- a tappet functionally connected to the compensator that moves in a compensation direction (K) when the compensator expands or contracts along the expansion direction (A);
- a lever that rotationally and/or pivotally connects the compensator to the tappet to obtain the functional connection; and
- wherein a hole is positioned in the lever into which a pin is inserted, about which the lever rotates and/or pivots.

2. The device according to claim 1, wherein the lever has at least one additional hole into which the insertion pin can be inserted to obtain a different pivotal axis.

3. The device according to claim 2, wherein the compensator has a compensator-lever pin about which the first lever and the second lever rotate and/or pivot, wherein the compensator-lever pin is placed in the first hole or the at least one second hole, and the insertion pin is then placed in another of the first hole or the at least one second hole.

4. The device according to claim 1, wherein at least some sections of the lever are curved.

5. The device according to claim 1, wherein the tappet has a joint with which the device can be coupled to a light unit.

6. The device according to claim 5, wherein the joint is a ball joint.

7. The device according to claim 1, further including a second lever, wherein an inner side of the first lever and an inner side of the second lever encompass the tappet and/or the compensator.

8. The device according to claim 1, wherein the lever is positioned in the middle of the compensator such that the compensator encompasses the lever on inner sides of the compensator, and/or the lever is positioned in the middle of the tappet, such that the tappet encompasses the lever on inner sides of the tappet.

9. The device according to claim 1, wherein the insertion pin is placed between the tappet and compensator, or the compensator is placed between the tappet and the insertion pin.

10. The device according to claim 9, wherein the insertion pin is placed between the tappet and compensator in the vertical direction (V) and/or in the compensation direction (K).

11. The device according to claim 9, wherein the compensator is placed between the tappet and the insertion pin in the vertical direction (V) and/or in the compensation direction (K).

12. The device according to claim 1, wherein the compensator has a compensator-housing pin about which the compensator rotates and/or pivots.

13. The device according to claim 12, wherein the compensator rotates and/or pivots in relation to a housing for the device.

14. The device according to claim 1, further comprising a bushing between the lever and tappet, wherein the bushing has at least one sliding surface along which the lever slides.

15. A headlamp comprising at least one device according to claim 1.

16. A device for compensating for thermal expansion in a headlamp, the device comprising:
- a compensator configured to expand or contract in an expansion direction (A), depending on the temperature;
- a tappet functionally connected to the compensator that moves in a compensation direction (K) when the compensator expands or contracts along the expansion direction (A);
- a lever that rotationally and/or pivotally connects the compensator to the tappet to obtain the functional connection; and
- further comprising a retainer with which the device is adjustably retained on or in the headlamp, wherein the retainer is aligned with the tappet, wherein the retainer and tappet are spaced apart, and the distance between the retainer and the tappet changes with the temperature.

17. The device according to claim 16, further comprising a housing that at least partially encloses the compensator, the first lever, a second lever, the insertion pin, retainer, and/or tappet, wherein the insertion pin is placed in a hole in the housing such that the lever pivots about the insertion pin, wherein the housing has a slider with which the housing is moveably supported on and/or in a headlamp.

18. A device for compensating for thermal expansion in a headlamp, the device comprising:

a compensator configured to expand or contract in an expansion direction (A), depending on the temperature;

a tappet functionally connected to the compensator that moves in a compensation direction (K) when the compensator expands or contracts along the expansion direction (A);

a lever that rotationally and/or pivotally connects the compensator to the tappet to obtain the functional connection; and wherein the expansion direction (A) is at an angle to the compensation direction (K).

* * * * *